Nov. 28, 1967　　　　ISAO SATO　　　　3,354,800
METHOD OF MANUFACTURING PAPER PIPE

Filed July 7, 1965　　　　　　　　　　　　4 Sheets-Sheet 1

INVENTOR.
Isao Sato
BY

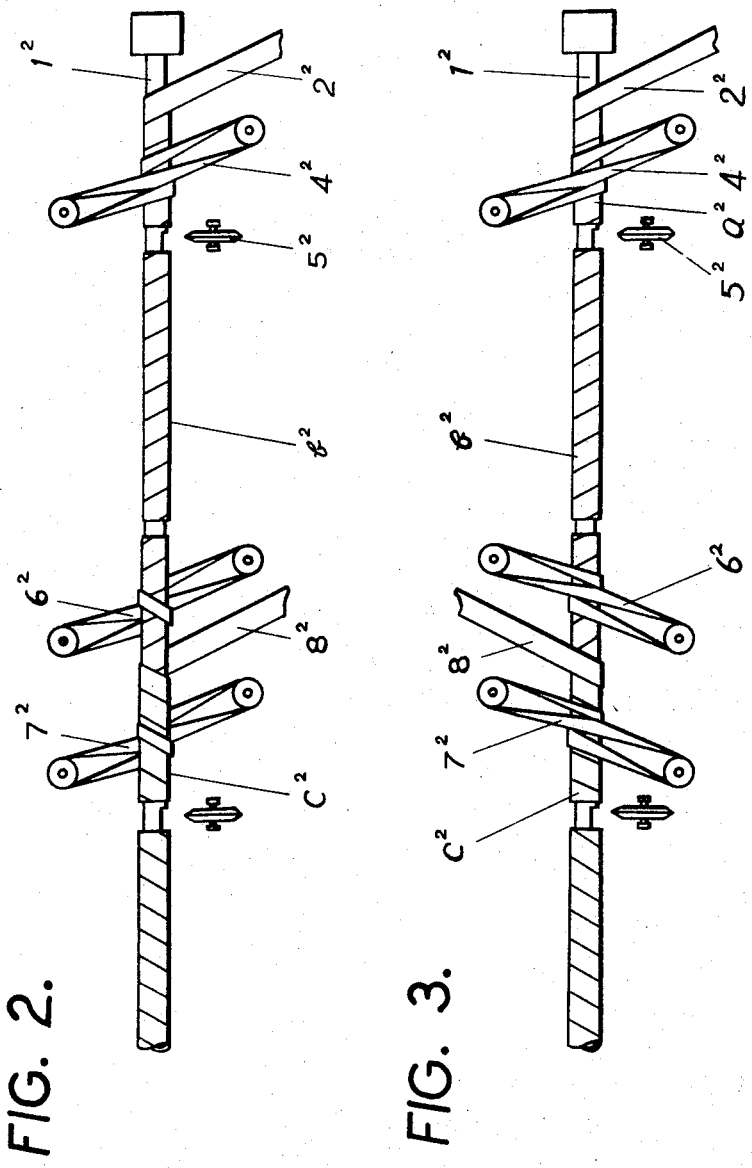

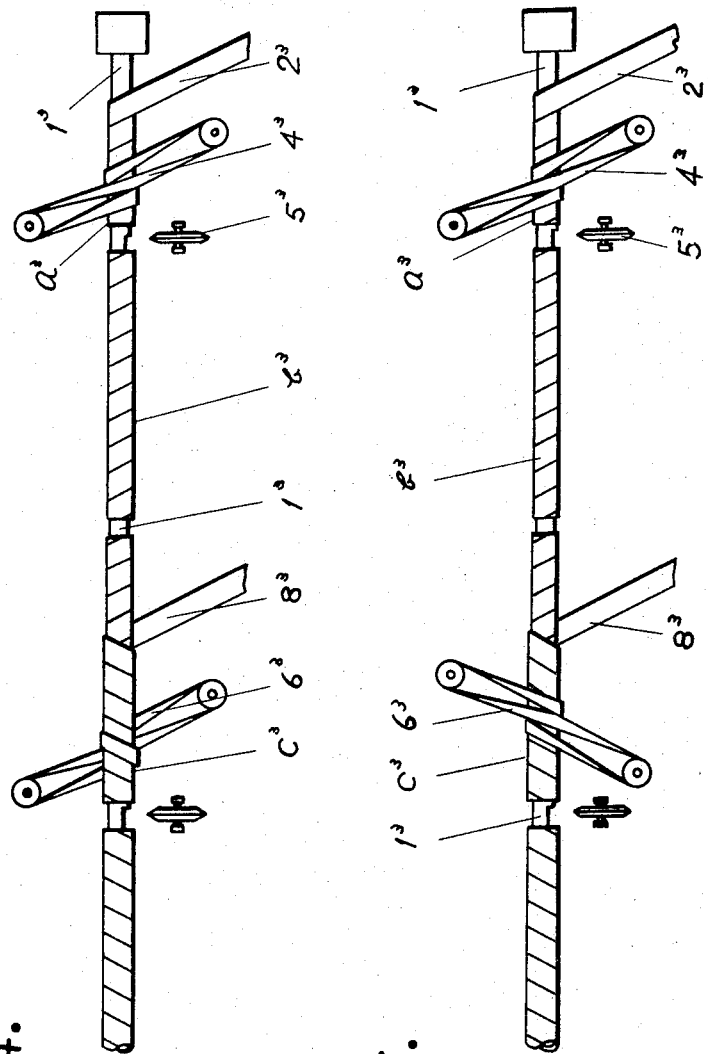

INVENTOR.
Isao Sato
BY Ernest Chantague
attorney

United States Patent Office 3,354,800
Patented Nov. 28, 1967

3,354,800
METHOD OF MANUFACTURING PAPER PIPE
Isao Sato, 20–5 Yamate-cho, Osaka Prefecture,
Hiraoka, Japan
Filed July 7, 1965, Ser. No. 470,046
Claims priority, application Japan, Apr. 26, 1965,
40/24,944; May 4, 1965, 40/26,313, 40/26,315
5 Claims. (Cl. 93—94)

ABSTRACT OF THE DISCLOSURE

A method of manufacturing a paper pipe which comprises the step of spirally winding material papers about a mandrel by means of a turning force provided by endless belts to the material papers to revolve in one direction, and to form a cylinder. A predetermined length of the cylinder is then cut without removing the latter from the mandrel and spirally winding material papers by means of a turning force in a direction opposite to the previous rotation, so as to cause the material papers to cross each other.

---

The present invention relates to a method of manufacturing a paper pipe used to roll about it various kinds of fiber, paper or the like, and which comprises the steps of inserting the tip of a tape formed material paper slantly at a certain angle between a mandrel. One end of the mandrel is fixed, and endless belts are driven to revolve by the pulleys arranged on both sides of the mandrel and around its base, so that, by the rotation of the endless belt in one direction, the material paper may be forced to spirally wind round the mandrel, to continuously form a cylinder on the mandrel, cutting the cylinder as soon as it reaches a required length without removing it from the mandrel, causing the cut cylinder to be pushed onwards on the mandrel by the succeeding cylinder, which is formed in succession, and to reach the next endless belt which is provided at a position contacting the mandrel, but separated from the previous endless belt and which is driven by the pulleys, which are arranged on both sides of the mandrel, to revolve in a direction opposite to that of the previous endless belt, so that the cut cylinder may also be forced to revolve in the direction opposite to that of the succeeding cylinder, and sticking the tip of another tape-formed material paper slantly on the forward tip of the cut cylinder so that the material paper may spirally wind about the cut cylinder at the same angle as before and both the first and second material papers may cross each other, jointly forming the same cylinder on the mandrel, which process is repeatedly continued until the cylinder becomes thick enough as the paper pipe, whenever necessary.

It is commonly known that most of the paper pipes used to roll about it various kinds of fibre, paper or the like are made of tape-formed material paper spirally wound about in one direction only, without crossing material papers each other as by the method of the present invention. As a result, the paper pipe made by the conventional method is weak especially against the orthogonal force axially extending to it and it is easily broken or distorted. Various attempts have been made to remove these shortcomings. It is one object of the present invention to provide a method of manufacturing a paper pipe which solves this problem.

With this and other objects in view, which will become apparent in the following detailed description, the present invention will be clearly understood, in conjunction with the accompanying drawing, in which:

FIGURES 1–7 illustrate the manufacturing processes of the paper pipe; and

Figure 1:
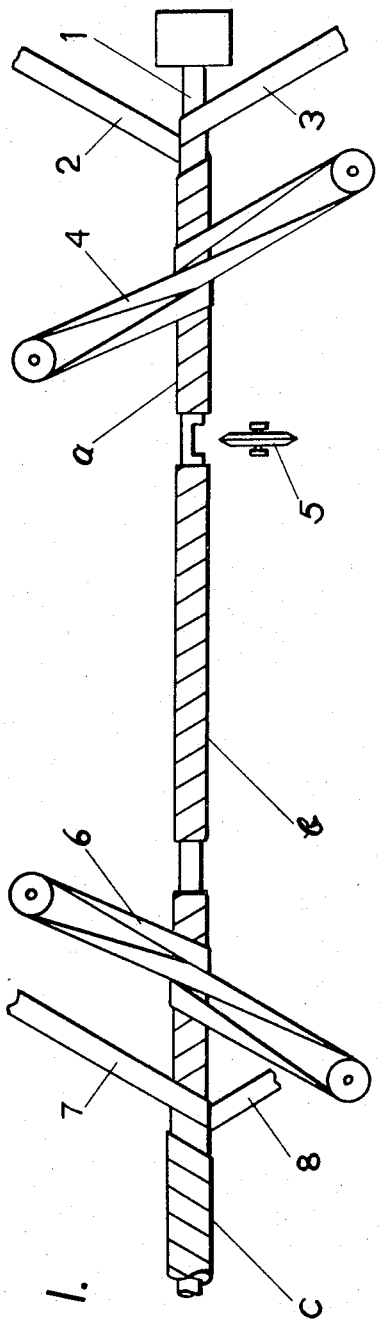
Figure 8:
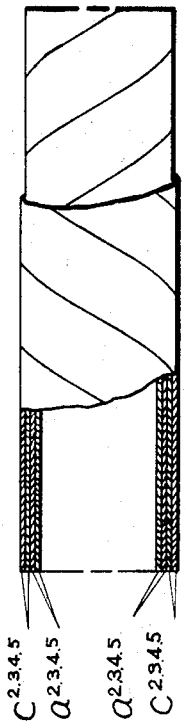
FIG. 8 is a partly notched cross-section of the paper pipe manufactured by the method of the present invention.

Referring now to the drawing, and in particular to FIG. 1 pulleys are arranged on both sides and around the base of a mandrel 1, which is horizontally disposed and has an outer diameter matching with the inner diameter of the paper pipe to be manufactured, and one end of which is fixed. They drive an endless belt 4 to revolve clockwise, for instance, which contact the mandrel 1 at the angle 60° and, between the mandrel 1 and the endless belt 4 are inserted tips of tape-formed material paper 2, the lower side of which being coated with such lubricants as paraffin and the like and another tape formed material paper 3, the lower side of which is likewise coated with such adhesives as glue and the like and thus cause both material papers folded on one another, while forcibly driven by the endless belt 4 to revolve at a certain speed, so that both material papers 2 and 3 advance to the left as shown in FIG. 1 in order to continuously form the cylinder $a$.

In the above illustration, the material papers 2 and 3 had best run parallel with the endless belt 4 in consideration of their frictional resistance and running speed, while the endless belt 4 can be arranged at various angles to the mandrel 1 ranging from 89° to 1°. But in view of the above-mentioned fact, its most suitable angle is 60°.

As soon as the cylinder $a$ is formed to have the required length, it is cut on the mandrel 1 by a cutter 5, which is supported by an arm and driven to revolve on the shaft which is connected with a motor so that the separated cylinder $b$ may be formed. The cylinder $b$ then stops revolving clockwise and is forced to advance to the left on the mandrel 1, as it is pushed by the advancing cylinder $a$ which is continuously formed.

As the cylinder $b$ comes off the endless belt 4 and reaches the next endless belt 6, which is arranged at the angle of 60° to the contacting mandrel 1 and which is driven to revolve counterclockwise by the pulleys provided on both sides of the mandrel 1, the cylinder $b$ is put between the endless belt 6 and the mandrel 1, so that it may continue to advance to the left at the same speed as the cylinder $a$, while revolving counterclockwise.

At that time, slightly ahead the endless belt 6, the tips of material papers 7 and 8, the lower sides of which are coated with an adhesive, are put between the endless belt 6 and the mandrel 1 at the same angle as and in parallel with the endless belt 6, so as to make the material paper 8 folded on the material paper 7, while slightly covering the tip of the revolving cylinder $b$, so that material papers 7 and 8 may wind about the cylinder $b$, while crossing material papers 2 and 3 which form the cylinder $a$, in order to form the cylinder $c$ in the end. Thus by the above-mentioned continuous method the paper pipe, which is strengthened by making the material papers 7 and 8 cross the material papers 2 and 3 can be easily and economically manufactured for any required length.

Referring now to FIGS. 2 and 3, the cylinder $a^2$, which is formed continuously in the same way as the cylinder $a$ in the preceding embodiment, is cut to separately form the cylinder $b^2$. As this cylinder $b^2$ advances to reach two endless belts $6^2$ and $7^2$ which are arranged with a space narrower than the length of the cylinder $b^2$ and at the angle of 60° to the mandrel $1^2$ to be driven by pulleys to revolve in a direction opposite to the previous rotation, while contacting the mandrel $1^2$, the cylinder $b^2$ is put between the mandrel $1^2$ and the endless belts $6^2$ and $7^2$ to be forcibly revolved counterclockwise, while advancing at the same speed as the cylinder $a^2$ which revolves clockwise.

At that time, the tip of tape-formed material paper $8^2$, the lower side of which is coated with such an adhesive as glue, is stuck on the forward tip of the cylinder $b^2$, which revolves counterclockwise, slightly covering it and crossing material paper $2^2$, which forms the cylinder $b^2$, at the same angle as the endless belts $6^2$ and $7^2$, so that the material paper $8^2$ may be wound round the advancing cylinder $b^2$ to form the cylinder $c^2$.

Since the cylinder $b^2$ is cut apart from the cylinder $a^2$, as soon as the latter reaches the required length, and is pushed between the endless belts $6^2$ and $7^2$ to make it revolve counterclockwise, while the tip of the material paper $8^2$ is stuck on the forward tip of the cylinder $b^2$, slightly covering it, between the revolving endless belts $6^2$ and $7^2$ so as to make the material papers $8^2$ and $2^2$ cross each other as mentioned above, the cylinder $c^2$ which is wound about by the material paper $8^2$ is pushed between the endless belts $7^2$ and the contacting mandrel $1^2$ before the cylinder $b^2$ separates from the endless belt $6^2$ and, even when the said cylinder separates from the endless belt $6^2$, it advances while continuously revolving counterclockwise at a definite speed. In this way the strengthened paper pipe of any required length can be easily formed by the continuous process as above-mentioned.

Referring now to FIGS. 4 and 5, the cylinder $a^3$, which is formed continuously in the same way as the cylinder $a$ in the first embodiment, is cut to separately form the cylinder $b^3$. As the cylinder $b^3$ reaches the endless belts $6^3$, which is arranged at the angle of 60° to the mandrel $1^3$ and driven to revolve counterclockwise, while contacting the mandrel $1^3$, the cylinder $b^3$ is pushed between the endless belt $b^3$ and the mandrel $1^3$ to be forcibly revolved counterclockwise, while advancing at the same speed as the cylinder $a^3$.

At that time, slightly ahead of the endless belt $6^3$ and just before the cylinder $b^3$ is pushed between the endless belt $6^3$ and the mandrel $1^3$, the tip of material paper $8^3$, the lower side of which is coated with such an adhesive as glue, is stuck on the tip of the cylinder $b^3$ slightly covering it and at the same angle as that of the endless belt $6^3$, so that material paper $8^3$ may be wound about the advancing cylinder $b^3$ by the endless belt $6^3$ to form the cylinder $c^3$ in the end.

As mentioned above, when the cylinder $a^3$, which is formed continuously by winding round material paper $2^3$ spirally with the aid of the endless belt $4^3$ that revolves clockwise, reaches the required length, it is cut by the cutter $5^3$, for example, without removing it from the mandrel $1^3$, so as to form the cylinder $b^3$, which is then pushed between the mandrel $1^3$ and the endless belt $6^3$ that revolves counterclockwise, so that the cylinder $b^3$ may be driven to revolve also counterclockwise. Slightly ahead of the endless belt $6^3$ and just before the cylinder $b^3$ is pushed between the mandrel $1^3$ and the endless belt $b^3$, the tip of the material paper $8^3$ is stuck on the tip of the cylinder $b^3$ slightly covering it, so as to wind the material paper $8^3$ about the cylinder $6^3$, in order to cause the material papers $2^3$ and $8^3$ to cross each other. In order to join together the material paper $8^3$, which is wound about the cylinder $b^3$ that is cut first, the forward tip of the cylinder $b^3$, which is formed next, and the rear end of the cylinder $b^3$ that is formed first, the cylinder $b^3$ which is formed later is succeeded by the cylinder $c^3$ on account of the material paper $8^3$ which forms the cylinder $c^3$ by means of the endless belt $6^3$, as soon as the material paper $8^3$ reaches a position to be wound about the cylinder $b^3$, so that the paper pipe having any required thickness can be easily manufactured by the continuous process as above-mentioned.

Figure 6:
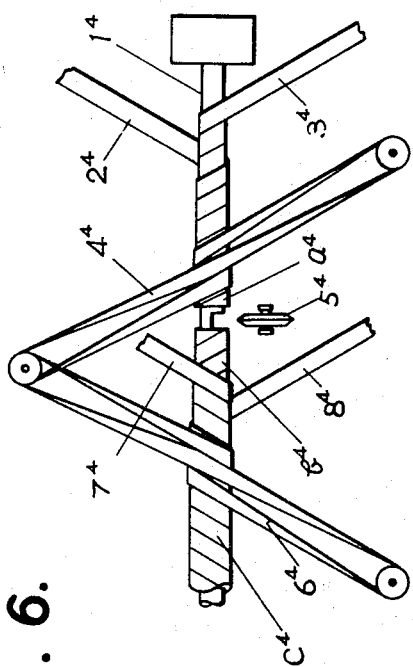

Referring now to FIG. 6, the cylinder $a^4$, which is continuously formed in the same way as the cylinder $a$ mentioned in the connection with the first embodiment, is cut to form the cylinder $b^4$, which advances to reach the endless belt $6^4$, which revolves counterclockwise and consequently drives the cylinder to revolve counterclockwise at the same speed as the cylinder $a^4$. Slightly ahead of the endless belt $6^4$ and just before the cylinder $b^4$ is pushed between the endless belt $6^4$ and the mandrel $1^4$ the tips of the tape-form material papers $7^4$ and $8^4$, the lower sides of which are coated with such adhesives as glue and the like, are stuck on the forward tip of the cylinder $b^4$, slightly covering it, so as to cause the material papers $7^4$ and $8^4$ to cross each other at the same angle as the endless belt $6^4$, forming the cylinder $c^4$ in the end. The angle between the endless belt $6^4$ and material papers $7^4$ and $8^4$ should best be the same as that between the endless belt $4^4$ and the material papers $2^4$ and $3^4$. In order for the material papers $7^4$ and $8^4$ to join together the forward tip of the cylinder $b^4$ which is formed next and the rear end of the cylinder $b^4$, which is formed first, the cylinder $b^4$, which is formed later is succeeded by the cylinder $c^4$ on account of the material papers $7^4$ and $8^4$ by means of the endless belt $6^4$. Therefore, in this way the paper pipe of any required length can be easily and economically manufactured.

Figure 7:
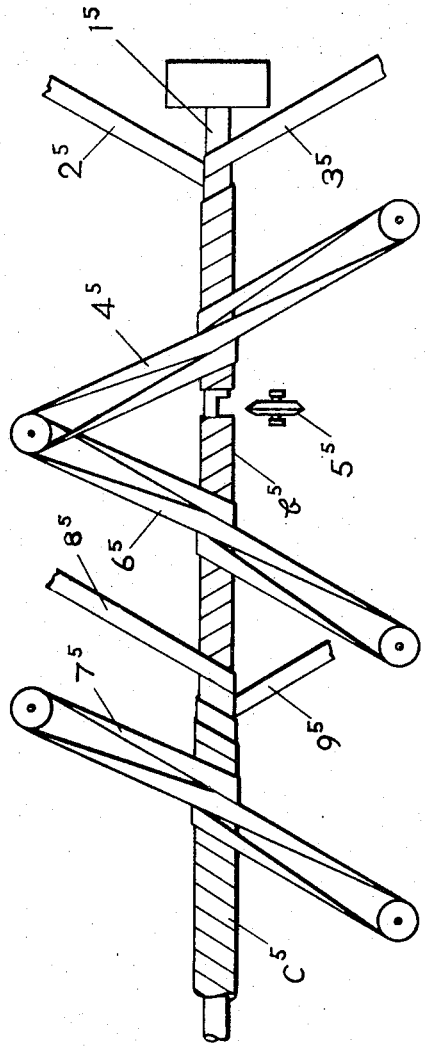

Referring now to FIG. 7, the cylinder $a^5$, which is formed in the same way as the cylinder $a$ in the first embodiment, is cut to form the cylinder $b^5$, which advances and reaches the endless belt $6^5$, one end of which is arranged coaxially with the above-mentioned endless belt $4^5$ and which is provided such as to contact the mandrel $1^5$ at the angle of 60°, while revolving counterclockwise. It further advances and reaches the endless belt $7^5$ which is arranged to contact the mandrel $1^5$ at the same angle as the endless belt $6^5$ within the space which is narrower, measured from the endless belt $6^5$, than the length of the cylinder $b^5$, while revolving also in the same direction as the endless belt $6^5$. The cylinder $b^5$ is then driven by the endless belt $7^5$ to revolve at the same speed and in the same direction as the endless belt $6^5$, while advancing onwards. At that time, the tip of tape-form material papers $9^5$ and $8^5$, the lower sides of which are coated with such adhesives as glue and the like, are stuck on the tip of the cylinder $b^5$ which revolves counterclockwise, slightly covering it, so as to cause the material papers $9^5$ and $8^5$ to cross material papers $2^5$ and $3^5$ at the same angle as the endless belts $6^5$ and $7^5$, forming the cylinder $c^5$ in the end. The angles between the endless belts $9^5$ and $8^5$ and the material papers $9^5$ and $8^5$ had best be the same as those between the endless belt $4^5$ and the material papers $2^5$ and $3^5$.

Since the cylinder $c^5$ which is wound about with the material papers $9^5$ and $8^5$ is pushed between the endless belt $7^5$ and the mandrel $1^5$ before the cylinder $b^5$ is separated from the endless belt $6^5$, as above mentioned, the material papers $9^5$ and $8^5$ continue to be wound about it at a definite speed, even after it comes off the endless belt $6^5$. As a result, the paper pipe of a required length can be easily and economically manufactured by such a continuous process as above-mentioned.

When the paper pipe is manufactured of several layers of material paper, the mandrel should be extended as long as required, so that a required numer of the endless belts may be arranged. It is needless to mention that, since the rear end of the cut cylinder will remain connected with the forward tip of the succeeding cylinder, because material papers which are wound about the cut cylinder continue winding, the latter should be cut off again by applying the cutter to its rear end.

Because of the paper pipe made by the method according to the present invention being made up of several folded paper layers which cross each other, it is strong especially against an orthogonal force and it hardly becomes distorted. Compared with the conventional paper pipes, it is far stronger and its ends will never be cracked, if it is made of material paper which is slightly inferior to that of the conventional paper pipes.

While I have disclosed several embodiments of the present invention, it is to be understood that these embodiments are given by example only and not in a limiting sense, the scope of the present invention being determined by the objects and the claims.

I claim:
1. A method of manufacturing a paper pipe, comprising the steps of
spirally winding material papers about a mandrel by means of a turning force provided by endless belts to said material papers to revolve in one direction, and to form a cylinder,
cutting a predetermined length of said cylinder, without removing the latter from said mandrel, and
spirally winding material papers about said cylinder by means of a turning force in a direction opposite to the previous rotation, so as to cause said material papers to cross each other.
2. The method, as set forth in claim 1, wherein
said step of spirally winding material papers about said cut cylinder in opposite direction is provided, measured from one of said endless belts, by two endless belts arranged within a space narrower than the length of said cut cylinder.
3. The method, as set forth in claim 1, wherein
said step of spirally winding material papers about said cut cylinder in opposite direction is started from a position on said cylinder and slightly ahead of said endless belt.
4. The method, as set forth in claim 3, wherein
said step of spirally winding material papers in said one direction is performed by means of a first of said endless belts,
said step of spirally winding material papers about said cut cylinder in opposite direction is performed by a second endless belt, and
one end of the latter is coaxially arranged with said first endless belt.
5. The method, as set forth in claim 4, wherein
said step of spirally winding material papers about said cut cylinder in opposite direction is provided, measured from one of said endless belts, by two endless belts arranged within a space narrower than the length of said cut cylinder.

References Cited

UNITED STATES PATENTS

| | | | |
|---|---|---|---|
| 931,134 | 8/1909 | Lutz | 93—80 |
| 1,039,341 | 9/1912 | Wheeler et al. | 93—80 |

BERNARD STICKNEY, *Primary Examiner.*